E. C. HORST.
GUARD FOR HOP PICKERS.
APPLICATION FILED MAY 5, 1910.
1,012,136.
Patented Dec. 19, 1911.
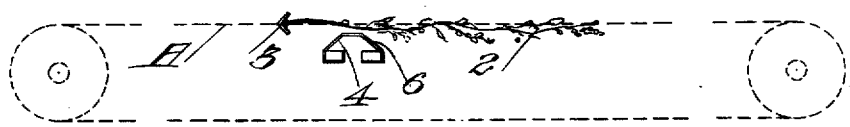
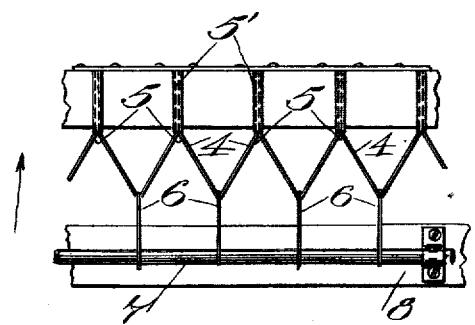
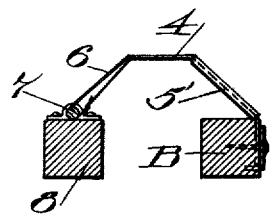
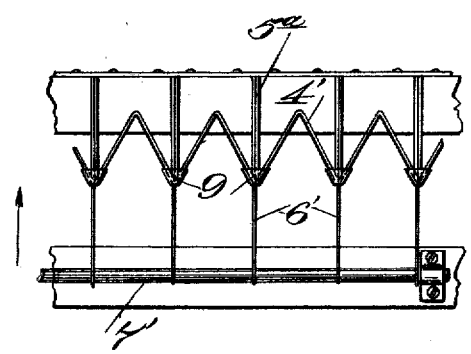
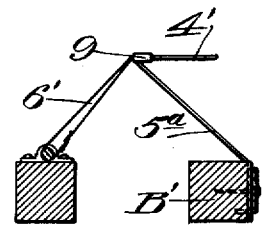

UNITED STATES PATENT OFFICE.

EMIL CLEMENS HORST, OF SAN FRANCISCO, CALIFORNIA.

GUARD FOR HOP-PICKERS.

1,012,136.  Specification of Letters Patent.  Patented Dec. 19, 1911.

Application filed May 5, 1910. Serial No. 559,615.

*To all whom it may concern:*

Be it known that I, EMIL CLEMENS HORST, citizen of the United States, residing in the city and county of San Francisco and State of California, have invented new and useful Improvements in Guards for Hop-Pickers, of which the following is a specification.

My invention relates to hop-picking machines, and machines of a kindred character. The object of the present invention is to provide a simple, practical means for guarding the entering points of the picking devices, so that the hops or other fruit will not be broken or injured by forcible contact with any sharp points or projections.

The invention consists of the parts and the construction and combination of parts as hereinafter more fully described and claimed, having reference to the accompanying drawings, in which—

Figure 1 is a diagrammatic representation in side elevation of the invention. Figs. 2 and 3 are plan views of different forms of guarding devices. Figs. 4 and 5 are side elevations corresponding, respectively, to the devices of Figs. 2 and 3.

A is an endless carrier of any suitable description to which the vines 2, carrying the hops or other fruit to be picked, are suitably attached by any appropriate means, represented at 3. The carrier A being operated at suitable speed by appropriate means, draws the vine 2 across the picking devices by which the hops or fruit are picked. These picking devices preferably consist of V-shaped or serrated pickers, represented at 4 in the drawings, with the apex 5 of each V-opening closed, and the wider end of the V-space open and presented toward the hops, as the same are drawn across the pickers by the carrier A; the hops dropping down into the V-opening and being severed from the stem when the hop catches in the crotch of the picker. These picking members 4 may be made either of wire or serrated plate. Preferably they are made of wire with angularly-bent stems connected in pairs by suitable means, as the sleeves 5', and these stems being properly secured to a part B supported independent of the carrier A.

The important feature of this invention is the means provided for guarding the open ends of the V-shaped pickers. In addition to having the apex of the V closed, the heel or serrated edge of the picker is preferably guarded, so that the hops will not be speared or torn by hitting any sharp or pointed edges. Therefore, to that end I provide a suitable form of guard whereby the hops are led or directed into the V-openings in a suitable manner. In Fig. 2, these guards for the V-openings consist of a series of wires 6 fastened to the points of the picking members and extending downward and forward to connect to a bar 7 arranged out of interference with the traveling hops, this bar having a suitable support, as 8. These wires 6 act to guide the depending hops into the V-openings of the pickers, as the vine is made to travel in the direction of the arrow; the hops being severed by engaging in the crotches of the V-openings.

In Figs. 3 and 5, the pickers are made of wire peculiarly bent, so that when viewed as in plan, Fig. 3, the pickers are essentially M-shape, with the legs of the M constituting the stems $5^a$ bent at an angle of approximately 45° to the horizontal V-shaped portion 4', and the lower ends of the stems are suitably secured to the part B'; the V-openings of the picker being formed by the re-entrant portions of the wire. The angles or points of the pickers formed by the junction of the downwardly bent stems and horizontal convergent portions 4' are suitably secured together and guarded by means of the conical caps 9 and wires 6', which latter connect the caps or points of the pickers with the bar 7'. This bar 7' is similar to and mounted similarly as bar 7 of Figs. 2 and 4. In both these styles of guarding, the guarding members 6—6' are rigidly connected to the points of the serrated pickers, and the lower ends of the guards suitably secured out of interference with the approaching hops.

Manifestly this form of picker and guard may be mounted stationary and the hops drawn across the pickers, or the guarded picker may be made to travel in opposition to the travel of the hops.

One of the principal reasons for guarding the picking fingers is to keep the bulk of the vines and leaves off of the pickers, and to provide means for picking clean hops, with a minimum of clusters, and to prevent the dismembering of the vines which would take place if the ends of the serrated pickers were not guarded. Without guards there is nothing to prevent the catching of either the branches or main portion of a vine itself in the closed V of the picking member, which would result in a lot of unnecessary trash being picked or torn off with the hops. These broken portions of branches or vines would become waste and adhere to the picking members, thereby destroying their efficiency; besides, this trash would detract from the value of the picked product. By the use of the guards the vines are supported and only the protruding hops are caught and picked.

Having thus described my invention, what I claim and desire to secure by Letters Patent is—

1. A hop-picking device made of wire bent to provide a succession of V-shaped openings, with suitable supporting means therefor, and guarding members at the mouth of the openings and in the bend formed by the convergent walls of two of said V-shaped openings, and said members having their points of attachment forward and out of the plane of the picker.

2. A hop-picking device consisting of a piece of wire bent into substantially M-shape, with the legs of said M bent in a plane angular to the plane of the central V-shaped portion, with a suitable support for the legs of said M-shape, and parallel guard wires connected to the picker at the juncture of said legs with the central V-portion.

3. A hop-picking device consisting of a piece of wire bent into substantially M-shape, with the legs of said M bent in a plane angular to the plane of the central V-shaped portion, with a suitable support for the legs of said M-shape, and parallel guard wires connected to the picker at the juncture of said legs with the central V-portion, said wires having a suitable point of support forward and below the plane of said central V-shaped portion.

In testimony whereof I have hereunto set my hand in the presence of two subscribing witnesses.

EMIL CLEMENS HORST.

Witnesses:
 THEO. EDER,
 MILTON N. MILLER.

Copies of this patent may be obtained for five cents each, by addressing the "Commissioner of Patents, Washington, D. C."